A. G. HENKEL.
HAT SHAPING DEVICE.
APPLICATION FILED MAY 21, 1918.

1,392,828. Patented Oct. 4, 1921.

Witnesses

Inventor
August G. Henkel
By Heidman & Street
Attorneys

UNITED STATES PATENT OFFICE.

AUGUST G. HENKEL, OF CHICAGO, ILLINOIS, ASSIGNOR TO D. B. FISK & CO., OF CHICAGO, ILLINOIS, A CORPORATION OF ILLINOIS.

HAT-SHAPING DEVICE.

1,392,828.      Specification of Letters Patent.      Patented Oct. 4, 1921.

Application filed May 21, 1918. Serial No. 235,825.

*To all whom it may concern:*

Be it known that I, AUGUST G. HENKEL, a citizen of the United States, and a resident of Chicago, in the county of Cook and State of Illinois, have invented a certain new and useful Improvement in Hat-Shaping Devices, of which the following is a description, reference being had to the accompanying drawing, which forms a part of my specification.

My invention relates to devices adapted for use in connection with the vacuum process or method employed for shaping hats, whether of felt, straw or other material; the invention being more particularly intended for use in connection with the process and apparatus set forth and described in United States Letters Patent No. 1,080,731, of December 9th, 1913. The method as described in said patent requires the employment of an elastic, impermeable membrane or hood, in conjunction with the molds or dies, whereby the material or hat is shaped through the action of vacuum formed within the mold and membrane or hood.

In the practice of the process just referred to, the hat or material, previously impregnated with the proper size, is placed on the metal mold or die, and the latter, together with the hat or material, placed on a perforated heating member or hot-plate. The hat and mold, as well as the upper perforated portion of the hot-plate, are then covered or inclosed with the membrane or hood, by fastening the latter to the hot-plate so as to provide an inclosure to be heated in a suitable manner, as, for example, by superheated steam from a suitable source of supply. The hot-plate is also connected with a vacuum inducing apparatus, which enables a vacuum being formed in the hot-plate and space beneath the hood or membrane after proper heating of the die or mold and hat has been accomplished. The steam-applying element or heat-supplying conduit is then shut off from its communication with the hot-plate, and the vacuum-inducing apparatus brought into communication with the hot-plate.

In practice, the hood or membrane is usually secured to the heating chamber or hot-plate by a suitable tape or belt, placed around the sides of the hot-plate and so secured as to permit the quick removal of the hood or membrane when the forming action has been completed. After the hood or membrane has been put into place, the heating chamber or hot-plate, as well as the superimposed die or mold, are heated to a considerable degree, in order to properly heat the material or hat and the size with which it is impregnated.

The vacuum subsequently induced in the hot-plate and superimposed die causes the membrane to be drawn down snugly about the die or mold and also into more or less contact with the perforated top of the heating chamber or hot-plate.

It is evident, therefore, that the hood or membrane, in addition to the point where it is secured in place on the sides of the hot-plate, is constantly brought by the suction action or vacuum into contact not only with the sides of the heated mold or die, but also with portions of the top of the heating chamber or hot-plate with the result that the membrane or hood not only becomes soiled, but also scorched, and therefore soon becomes defective and results in a leaky hood or membrane which prevents its proper action in shaping or forming of the hat.

The object of my invention is to provide means, in the nature of an interchangeable die or mold-seat, preferably of suitable metal, which may be readily put into place on the heating chamber or hot-plate to support the mold or die in such manner as not to interfere with the proper action of the hot-plate and hat shaping members, but which will prevent the hood or membrane from being drawn into contact with the non-acting sides of the mold or die and the perforated top of the hot-plate.

With my improvement, the hat-forming process hereinbefore described can be practised to greater advantage and with greater efficiency; a smaller sized hood or membrane may be employed, a considerable saving of membrane or hood material induced; while the shaping or forming operation may be more quickly accomplished.

The invention and its advantages, as above enumerated, as well as other advantages inherent in the construction, will be more fully comprehended from the following detailed description of the drawing, wherein:—

Figure 1:
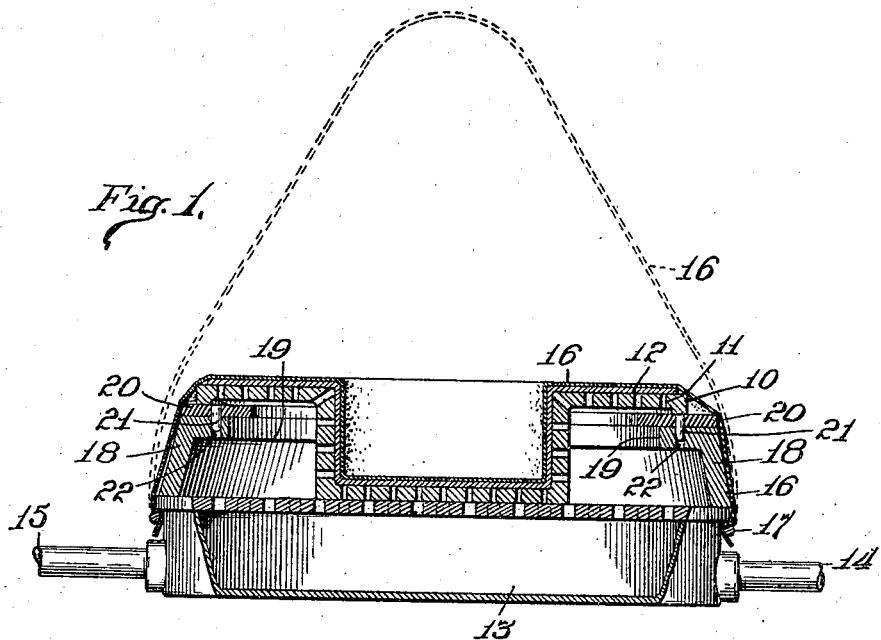
Figure 1 is a sectional elevation of hat shaping apparatus with my improved die-supporting means shown in position and the membrane or hood in forming relation with the hat induced by the vacuum; while the initial position of the hood or membrane is shown in dotted lines.

In the particular exemplification of the invention, I have shown it in conjunction with a recessed mold or die 10, which is preferably perforated, as shown at 11; the rim or flange portion of the die being adapted to form a flat brimmed hat which is indicated at 12; while the recessed portion of the die forms the crown.

In practising the method herein before set forth, the recessed or crown-forming portion of the die is placed in contact with the perforated top of the heating member or hot-plate 13. The hot-plate 13 is of a size suitable for the various sized dies or molds employed, being preferably circular and provided with a pair of conduits 14 and 15. One of the conduits, as for example 14, is connected with a suitable source of steam supply; the flow whereof into the hot-plate or member 13 may be controlled and quickly shut off by means of a suitable valve, not shown; while the other conduit 15 connects with suitable apparatus, not shown, for creating a vacuum in the hot-plate 13.

After the die 10 and the hat 12—which has previously been impregnated with size—have been placed on the hot-plate 13, the membrane or hood 16, composed of suitable impervious material, is secured to the side of the hot-plate 13 over the superimposed elements, as shown, in Fig. 1; any suitable means, as for example a cloth strap, shown at 17, and provided with a suitable buckle, being employed to hold the hood or apron 16 in place, so as to provide an air-tight closure.

In order that the entire die or mold may be properly heated, the top of the hot-plate 13 is provided with a suitable number of perforations throughout the entire top and therefore beyond the crown portion of the die, as shown in Fig. 1.

It is apparent that unless some means are provided, intermediate of the hot-plate 13 and the margin or perimeter of the mold or die 10, that will constitute a closure for the intervening space, the steam issuing from the hot-plate 13 through its perforations will come into direct contact at the sides beneath the rim of the die with the hood or membrane 16 and cause the latter to deteriorate.

It is also evident that after the heating operation is discontinued, and a vacuum is created through the hot-plate 13, that the hood or membrane 16 will not only be drawn into close and shaping relation with the hat on the die 10, but will also be drawn underneath the flange of the die into contact with the sides of the mold or die and the exposed top of the hot-plate 13, where it will not only become soiled, but also scorched and made defective.

Figure 2:
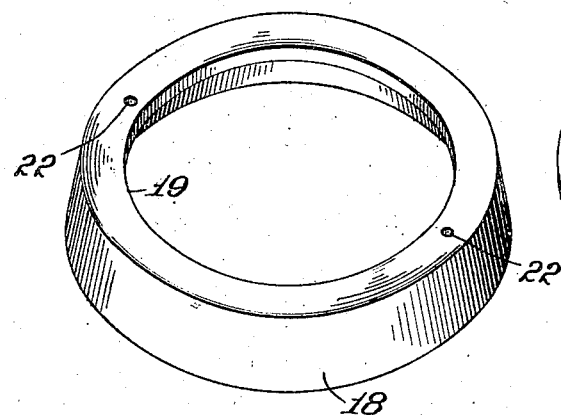
Fig. 2 is a perspective view of my improved die-seat or supporting means.

In order to overcome these serious difficulties, I have devised the removable and interchangeable die-seat member 18, shown in perspective in Fig. 2. This member 18 is preferably made of suitable metal; substantially circular, conforming with the hot-plates, and of a height approximating the predetermined depth of the recessed portion of the die, so as to inclose the space between the hot-plate 13 and the rim of the die or mold 10. In order to provide a proper seat for the rim or flange portion of the die or mold, I prefer to provide the die-seat member 18 with an inwardly presented flange 19 at the top; while the member 18 is preferably made slightly sloping outwardly toward the bottom so as to practically extend to the perimeter of the hot-plate 13, as shown in Fig. 1.

My improved die-seat member will prevent the membrane or hood 16 coming into contact with the top of the hot-plate 13 when a vacuum is created therein, and therefore prevents the hood from being scorched as is the case with the constructions previously employed. Furthermore, by preventing the hood from becoming drawn in beneath the flange or rim portion of the die and over the perforated top of the hot-plate 13, the efficiency of the apparatus and method are greatly enhanced, as the perforated surface is left free and unobstructed for the full action of the created vacuum; practically the entire pressure, resulting from the vacuum, is applied to the hat and hood or membrane, with the result that the great loss in percentage of vacuum pressure heretofore encountered in its action on the hood in contact with the perforated hot-plate, is now eliminated and a great saving in effective pressure percentage induced; wear and tear on the apparatus or machinery heretofore encountered, reduced; and an increase of perfect or flawless merchandise effected.

Figure 3:
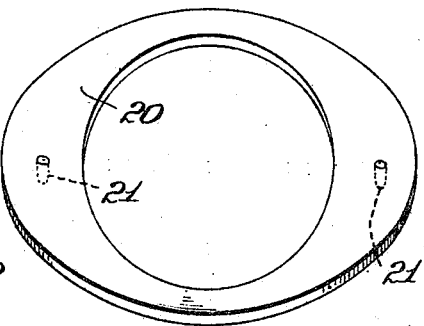
Fig. 3 is a perspective view of an auxiliary member or intermediate die-seat.

In order to adapt my invention to a greater variation in the sizes of dies or molds, I disclose a removable top member or flat seat 20, see Fig. 3, which is in the nature of a flat surfaced member substantially circular so far as the outer perimeter is concerned, with two sides of greater width at diametrically opposite points than the remainder of the seat member 20 so as to overlap or extend beyond the top flange 19 of the main die-seat member 18 and provide contact or suitable support for the superimposed flange or rim portion of the die.

Displacement of the member 20 is prevented by the pins 21, which are adapted to extend into the holes 22, 22, formed in the flange 19 of member 18, as illustrated in Fig. 1.

As the die or mold should preferably be in contact with the hot-plate, as shown in Fig. 1, the auxiliary seat-member 20 is usually employed in situations where the crown portion of the die is of greater depth than the vertical dimension of the die seat member 18, as above stated; the member 20 being dispensed with or removed where the usual sized molds or dies are in use.

Aside from preventing injury to the membrane or hood, as hereinbefore stated, my invention makes it possible to use smaller sized hoods, with the result that a considerable saving in hood material and its cost is effected; and the consumption of steam greatly reduced.

My invention also enables the operator to obtain a more secure fastening for the hood on the hot-plate, and possibility of miscalculation in the proper distribution of the hood over the die avoided, as the hood is prevented from being drawn in beneath and around the die.

In preventing the wetting and injury of the membrane or hood, the invention eliminates the possibility of staining and discoloring the merchandise or hats and also insures a proper finish for the hats; with the result that the cost of production is materially reduced and the output of superiorly finished merchandise greatly increased.

What I claim as my invention and wish to secure by Letters Patent is:—

1. In hat shaping devices of the class described, consisting of a hot-plate provided with a perforated top, a hat shaping die superimposed centrally on the hot-plate and a flexible hood secured at the sides of the hot-plate over the die, die-seat means comprising a metallic band of dimensions substantially equal to the dimensions of the hot-plate top, and a flat ring removably secured to the band top.

2. In hat shaping devices of the class described, comprising a hot-plate provided with a perforated top, a hat shaping die superimposed on the hot-plate and a flexible hood secured to the hot-plate across the die, die-seat means consisting of a metallic band of diameter substantially equal to the diameter of the hot-plate top and adapted to rest thereon adjacent the perimeter thereof, a flat ring adapted to rest on the band top, and means whereby the band and ring are held against displacement.

3. In a hat shaping device of the class described, the combination of a horizontally disposed hot-plate having a perforated flat top, a die, superimposed centrally on the hot-plate, having a laterally disposed rim, the die and its rim being provided with a plurality of perforations, and an interchangeable die-seat member consisting of a metallic band substantially equal in circumference at its bottom to the circumference of the hot-plate top so as to rest thereon without obstructing the perforations of the hot-plate, the side wall of said band being of a height substantially corresponding with the depth of the recessed portion of the die and of internal dimensions greater than the external dimensions of the die to provide a chamber intermediate of the band and the sides of the die, said band being provided at its top with an inwardly disposed flange adapted to contact with the rim of the die and form a seat therefor, with an impermeable flexible hood adapted to be removably secured over the die and about the sides of said metallic band and the sides of the hot-plate.

AUGUST G. HENKEL.

Witnesses:
GEORGE HEIDMAN,
F. A. FLORELL.